(12) United States Patent
Chen

(10) Patent No.: US 8,226,243 B2
(45) Date of Patent: Jul. 24, 2012

(54) LIGHT SOURCE MODULE AND PROJECTOR HAVING SAME

(75) Inventor: Chien-Fu Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 391 days.

(21) Appl. No.: 12/557,459

(22) Filed: Sep. 10, 2009

(65) Prior Publication Data

US 2010/0290011 A1 Nov. 18, 2010

(30) Foreign Application Priority Data

May 13, 2009 (CN) .......................... 2009 1 0302260

(51) Int. Cl.
*G03B 21/16* (2006.01)
*F21V 9/00* (2006.01)

(52) U.S. Cl. .......... 353/52; 362/231; 362/294; 361/709; 353/61

(58) Field of Classification Search .................... 353/52, 353/57, 58, 60, 61; 362/231, 547, 218, 294, 362/373; 315/307, 309; 361/690, 695, 696, 361/697, 702, 703, 709

See application file for complete search history.

(56) References Cited

U.S. PATENT DOCUMENTS

| | | | | |
|---|---|---|---|---|
| 7,152,978 B2* | 12/2006 | Konuma et al. | ................. | 353/57 |
| 7,866,852 B2* | 1/2011 | Kulkarni | ...................... | 362/294 |
| 2006/0203206 A1* | 9/2006 | Kim | ................................ | 353/58 |
| 2006/0215124 A1* | 9/2006 | Seo | ................................ | 353/52 |
| 2009/0059580 A1* | 3/2009 | Kwon | .......................... | 362/231 |
| 2009/0141247 A1* | 6/2009 | Oh | ................................... | 353/61 |
| 2010/0110393 A1* | 5/2010 | Chen et al. | ...................... | 353/58 |
| 2010/0118280 A1* | 5/2010 | Chen et al. | ...................... | 353/61 |

* cited by examiner

*Primary Examiner* — William C Dowling
(74) *Attorney, Agent, or Firm* — Altis Law Group, Inc.

(57) ABSTRACT

A light source module includes a first light source, a second light source, a third light source, and a first heat sink. The first heat sink includes a first base and a number of first fins. A bottom surface of the first base is attached to the first light source and the second light source. The first fins perpendicularly extend from a top surface of the first base away from the first light source and the second light source. Each first fin includes a first fin portion adjacent to the first light source and a second fin portion adjacent to the second light source, and defines a first slot for increasing the thermal resistance between the first fin portion and the second fin portion.

16 Claims, 4 Drawing Sheets

LIGHT SOURCE MODULE AND PROJECTOR HAVING SAME

BACKGROUND

1. Technical Field

The present disclosure relates to projectors and, particularly, to a light source module and a projector having the same with effective heat dissipation.

2. Description of Related Art

Due to reduction of the size of projectors, the density of generated heat in projectors increases accordingly. As a result, performance and reliability of the projectors will be influenced if heat dissipation is not effectively provided, and the service life span of the projectors may even be shortened. It is known that the light source module is the main heat source in a projector, hence, how to discharge the heat generated from the light source module effectively is a challenge to designers in the related fields.

What is needed, therefore, is a light source module and a projector having the same with effective heat dissipation to overcome or at least mitigate the above-described problem.

BRIEF DESCRIPTION OF THE DRAWINGS

Many aspects of the present light source module and projector can be better understood with reference to the accompanying drawings. The components in the drawings are not necessarily drawn to scale, the emphasis instead being placed upon clearly illustrating the principle of the present light source module and projector. In the drawings, all the views are schematic.

DETAILED DESCRIPTION

Embodiments of the present disclosure will now be described in detail below, with reference to the accompanying drawings.

Figure 1:
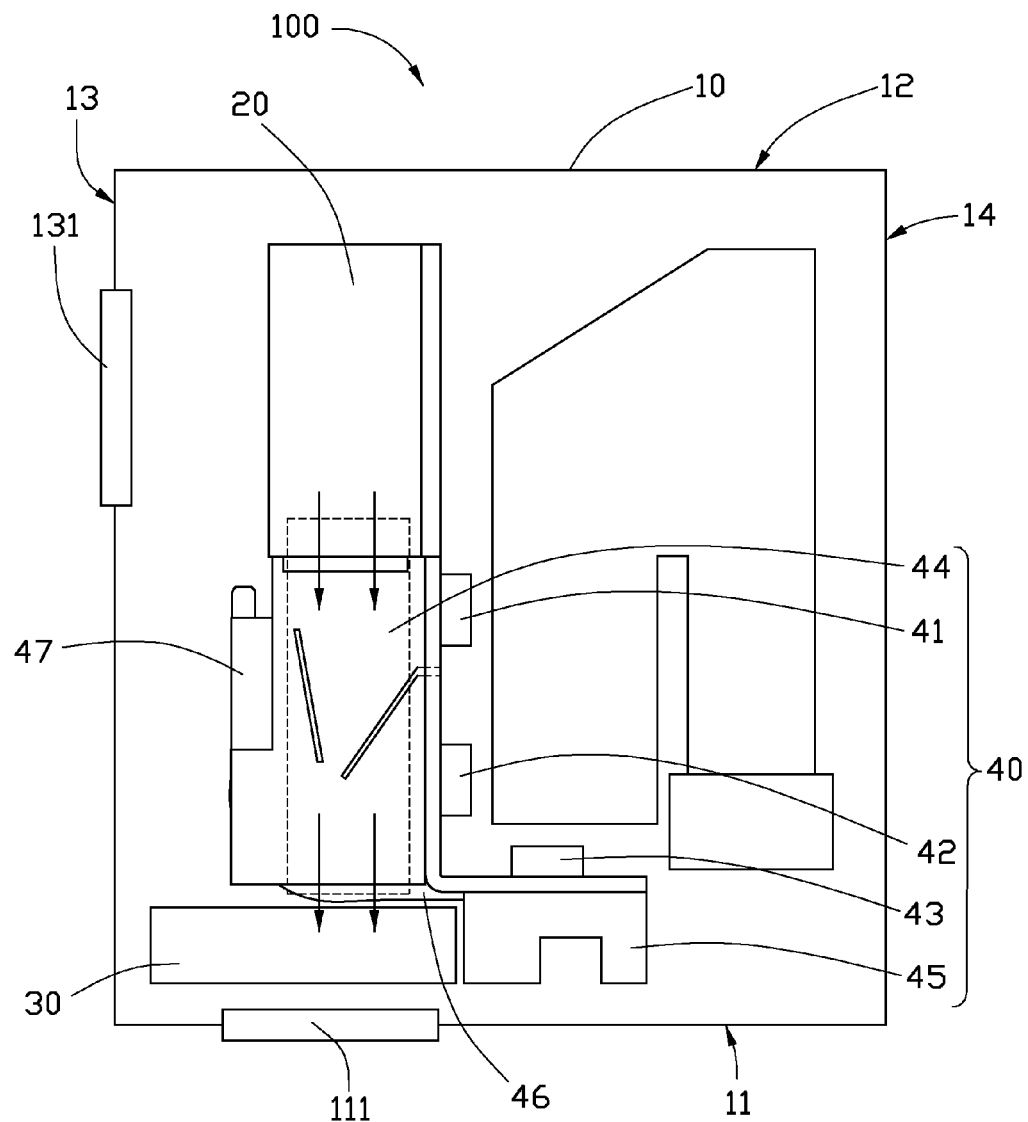
FIG. 1 is a top plan view of a projector according to a first exemplary embodiment.
Figure 2:
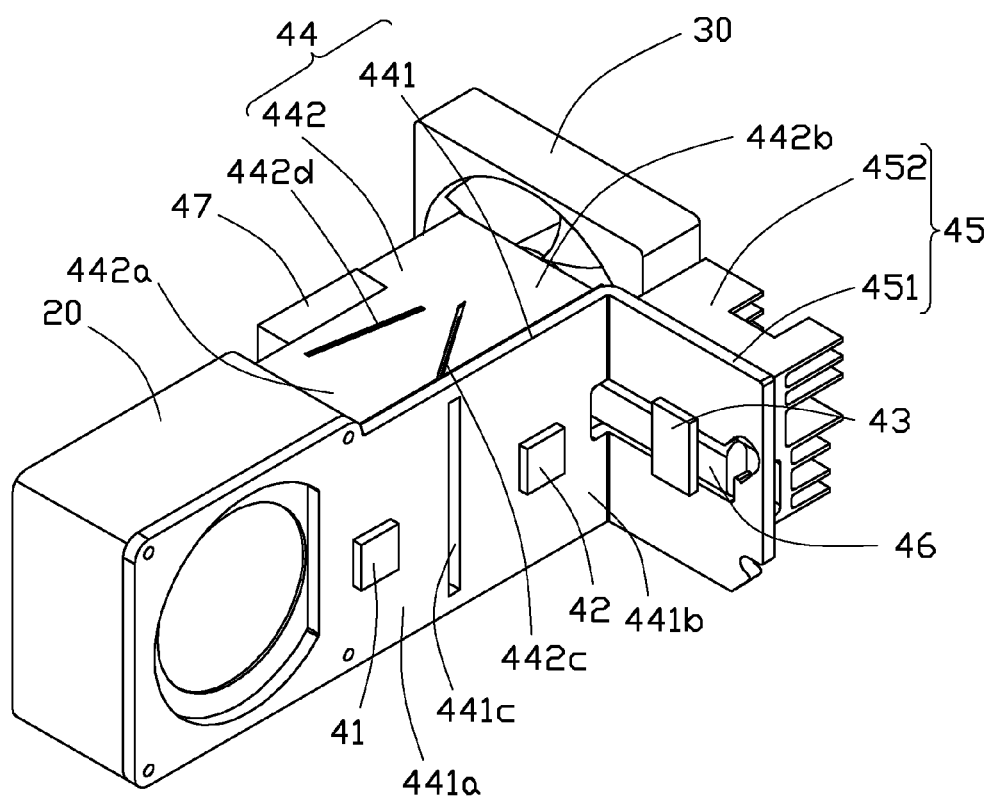
FIG. 2 is an isometric view of a light source module of the projector of FIG. 1.
Figure 4:
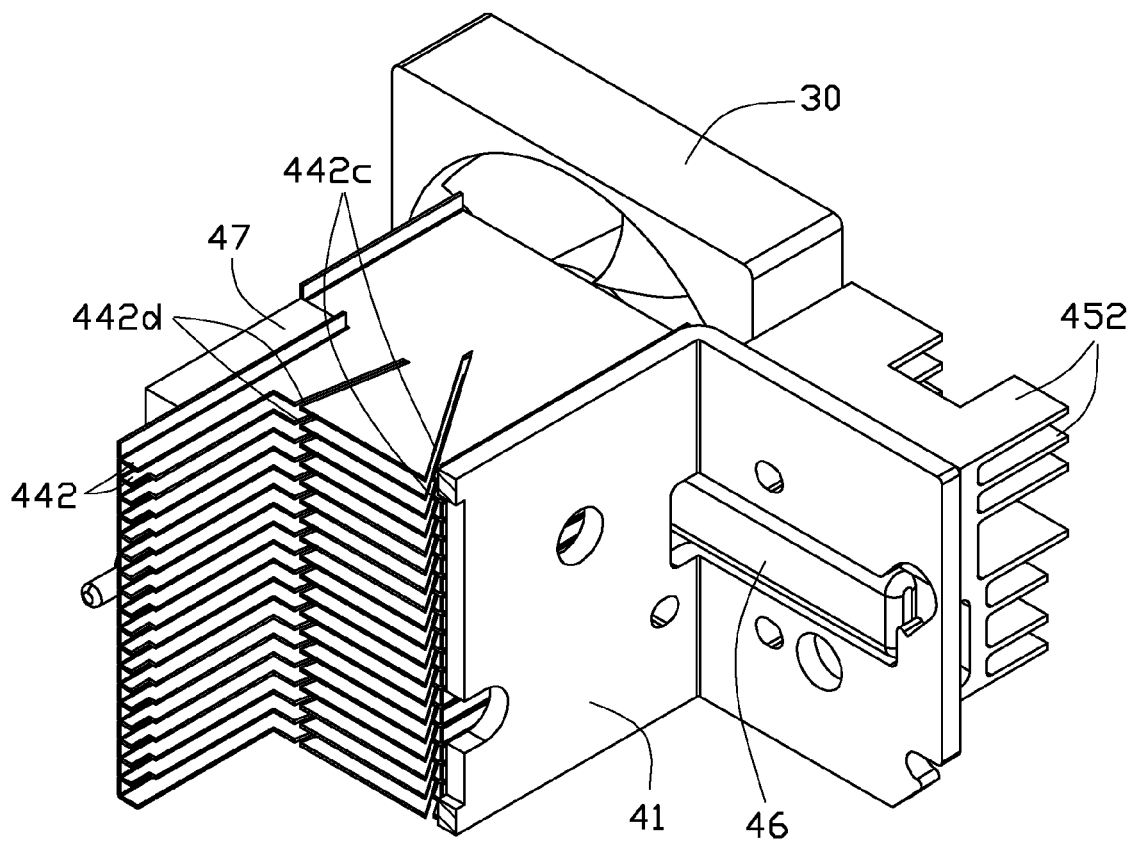
FIG. 4 is a cutaway view of the light source module of FIG. 2.

Referring to FIGS. 1, 2 and 4, a projector 100 according to an exemplary embodiment, is shown. The projector 100 includes a casing 10, a blower 20, an exhaust fan 30, and a light source module 40.

The casing 10 is configured for housing the blower 20, the exhaust fan 30, and the light source module 40. The casing 10 includes a front wall 11, a rear wall 12, a first sidewall 13, and a second sidewall 14 opposite to the first sidewall 13. The first sidewall 13, the front wall 11, the second sidewall 14, and the rear wall 12 are connected in sequence. In the present embodiment, the front wall 11 defines an air outlet 111, and the first sidewall defines an air inlet 131 adjacent to the rear wall. The exhaust fan 30 and the blower 20 are arranged corresponding to the air outlet 111 and the air inlet 131, respectively. The blower 20 is configured for blowing air coming into the casing 10 from the air inlet 131 towards the air outlet 111.

The light source module 40 includes a red light source 41, a blue light source 42, a green light source 43, a first heat sink 44, and a second heat sink 45.

In the present embodiment, the red light source 41, the blue light source 42, and the green light source 43 are light emitting diodes (LEDs). The red light source 41, the blue light source 42, the green light source 43 are arranged to form a L-shaped structure. The light emitting direction of the green light source 43 is perpendicular to the light emitting direction of the red light source 41 and the blue light source 42. The red light source 41 and the blue light source 42 are arranged along a direction from the blower 20 to the exhaust fan 30 in sequence.

The first heat sink 44 is attached to the red light source 41 and the blue light source 42 for dissipating heat generated from the red light source 41 and the blue light source 42. The first heat sink 44 includes a first base 441 and a number of first fins 442. A bottom surface of the first base 441 is attached to the red light source 41 and the blue light source 42, and the first fins 442 perpendicularly extend from a top surface of the first base 441 away from the red light source 41 and the blue light source 42. The first heat sink 44 is arranged between the blower 20 and the exhaust fan 30.

The first base 441 includes a first base portion 441a adjacent to the red light source 41 and a second base portion 441b adjacent to the blue light source 42. A base slot 441c is defined on the first base 441 located between the first base portion 441a and the second base portion 441b. Therefore, the thermal resistance between the first base portion 441a and the second base portion 441b can be increased. The base slot 441c can be designed running through the first base 441.

The first fins 442 are arranged substantially parallel to the air flowing direction between the blower 20 and the exhaust fan 30. Each first fin 442 includes a first fin portion 442a adjacent to the red light source 41 and a second fin portion 442b adjacent to the blue light source 42. A first slot 442c is defined on each of the first fins 442 located between the first fin portion 442a and the second fin portion 442b with the red light source 41 and the blue light source 42 located at two opposite sides thereof respectively. Therefore, the thermal resistance between the first fin portion 442a and the second fin portion 442b can be increased. Accordingly, the heat generated from the blue light source 42 would not influence the heat dissipating of the red light source 41.

The second heat sink 45 is attached to the green light source 43 for dissipating heat generated from the green light source 43. The second heat sink 45 includes a second base 451 and a number of second fins 452. The second fins 452 perpendicularly extend from a surface of the second base 451 away from the green light source 43. In the present embodiment, the second base 451 is substantially perpendicular to the first base 441, and is connected to the first base 441. In other embodiments, the red light source 41, the blue light source 42, and the green light source 43 can also be arranged on a line, and the second base 451 can be substantially coplanar with the first base 441.

In the present embodiment, the light source module 40 further includes a heat pipe 46 and a heat transmitting plate 47. The heat transmitting plate 47 is fixed to the top end of the first fins 442 away from the first base 441. The heat transmitting plate 47 is substantially perpendicular to the first fins 442, and is thermally coupled to the first fins 442. The heat pipe 46 is thermally coupled between the second base 451 of the second heat sink 45 and the heat transmitting plate 47. The heat pipe 46 and the heat transmitting plate 47 cooperatively transmit the heat from the second base 451 to the first fins 442. In the present embodiment, the first fin 442 further defines a second slot 442d between the heat transmitting plate 47 and the first base portion 441a. The heat transmitting plate 47 and the first base portion 441a are located at two opposite sides of the second slot 442d, therefore, the thermal resistance between the heat transmitting plate 47 and the first base portion 441a can be increased. Accordingly, the heat generated from the green light source 43 would not influence the heat dissipating of the red light source 41.

It is known that, the tolerable temperature of the red light source 41 is lower than that of the blue light source 42 and the green light source 43. In the present embodiment, the first slot 442c can increase the thermal resistance between the first fin portion 442a and the second fin portion 442b, therefore, the heat generated from the blue light source 42 would not influence the heat dissipating of the red light source 41, accordingly, the red light source 41 can have efficient heat dissipating. Furthermore, because the red light source 41 and the blue light source 42 uses one heat sink for heat dissipating, that would benefit to assembly the light source module 40.

Figure 3:
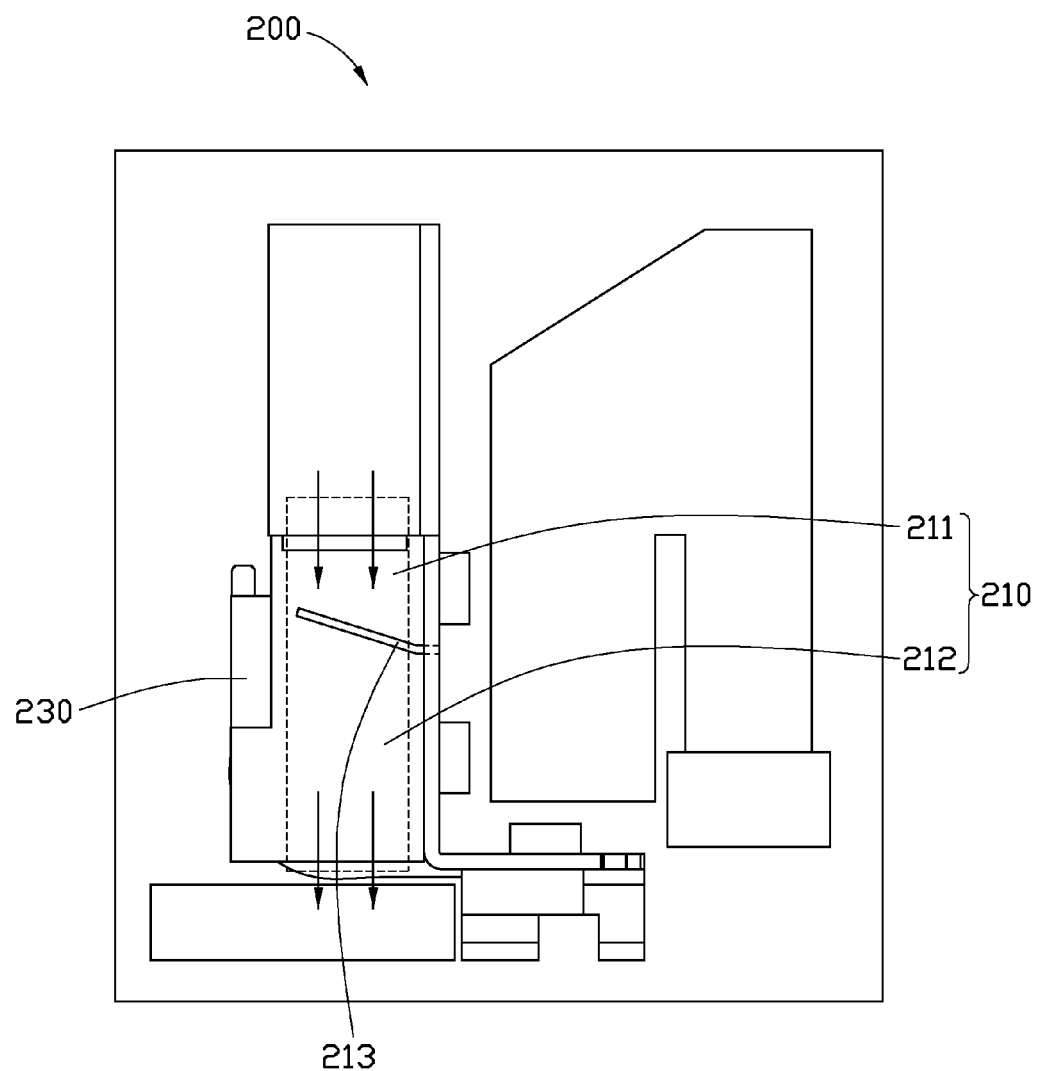
FIG. 3 is a top plan view of a projector according to a second exemplary embodiment.

Referring to FIG. 3, a projector 200 according to a second exemplary embodiment is shown. The projector 200 is similar to the projector 100 of the first exemplary embodiment. The difference between the projector 200 and the projector 100 is that, in the projector 200 of the second exemplary embodiment, each first fin 210 defines a slot 213. The first fin portion 211 located at one side of the slot 213, and the second fin portion 212 and the heat transmitting plate 230 located at the other side of the slot 213.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A light source module, comprising:
    a first light source;
    a second light source;
    a third light source;
    a first heat sink, comprising:
        a first base with a bottom surface attached to the first light source and the second light source; and
        a plurality of first fins perpendicularly extend from a top surface of the first base away from the first light source and the second light source, wherein each first fin comprises a first fin portion adjacent to the first light source and a second fin portion adjacent to the second light source, and defines a first slot for increasing the thermal resistance between the first fin portion and the second fin portion; and
    a second heat sink attached to the third light source for dissipating heat generated from the third light source;
    wherein the light source module further comprises a heat pipe and a heat transmitting plate, the heat transmitting plate is thermally coupled to the first fins, the heat pipe is thermally coupled between the second heat sink and the heat transmitting plate.

2. The light source module of claim 1, wherein the first light source is a red light source, the second light source is a blue light source, and the third light source is a green light source.

3. The light source module of claim 1, wherein the first base comprises a first base portion adjacent to the first light source and a second base portion adjacent to the second light source, and a base slot is defined on the first base located between the first base portion and the second base portion.

4. The light source module of claim 3, wherein the base slot runs through the first base.

5. The light source module of claim 1, wherein each first fin further defines a second slot between the heat transmitting plate and the first base portion with the heat transmitting plate and the first base portion located at two opposite sides of the second slot.

6. The light source module of claim 1, wherein first fin portion is located at one side of the first slot, and the second fin portion and the heat transmitting plate are located at the other side of the first slot.

7. A projector, comprising:
    a casing defining an air inlet and an air outlet;
    a blower for blowing air coming into the casing from the air inlet towards the air outlet; and
    a light source module, comprising:
        a first light source;
        a second light source;
        a third light source;
        a first heat sink arranged between the blower and the air outlet, the first heat sink comprising:
            a first base with a bottom surface attached to the first light source and the second light source; and
            a plurality of first fins perpendicularly extend from a top surface of the first base away from the first light source and the second light source, wherein each first fin comprises a first fin portion adjacent to the first light source and a second fin portion adjacent to the second light source, and defines a first slot for increasing the thermal resistance between the first fin portion and the second fin portion; and
        a second heat sink attached to the third light source for dissipating heat generated from the third light source:
        wherein the light source module further comprises a heat pipe and a heat transmitting plate, the heat transmitting plate is thermally coupled to the first fins, the heat pipe is thermally coupled between the second heat sink and the heat transmitting plate.

8. The projector of claim 7, wherein the first light source and the second light source are arranged along a direction from the blower to the air outlet in sequence.

9. The projector of claim 7, wherein the first fins are arranged substantially parallel to the air flowing direction between the blower and the air outlet.

10. The projector of claim 7, wherein the projector further comprises an exhaust fan arranged at the air outlet.

11. The projector of claim 7, wherein the casing comprises a first sidewall, a front wall, a second sidewall, and a rear wall connected in sequence, the air outlet is defined on the front wall, and the air inlet is defined on the first sidewall and adjacent to the rear wall relative to the front wall.

12. The projector of claim 7, wherein the first light source is a red light source, the second light source is a blue light source, and the third light source is a green light source.

13. The projector of claim 7, wherein the first base comprises a first base portion adjacent to the first light source and a second base portion adjacent to the second light source, and a base slot is defined on the first base located between the first base portion and the second base portion.

14. The projector of claim 13, wherein the base slot runs through the first base.

15. The projector of claim 7, wherein each first fin further defines a second slot between the heat transmitting plate and the first base portion with the heat transmitting plate and the first base portion located at two opposite sides of the second slot.

16. The projector of claim 7, wherein the first fin portion is located at one side of the first slot, and the second fin portion and the heat transmitting plate are located at the other side of the first slot.

* * * * *